United States Patent Office 2,728,778
Patented Dec. 27, 1955

2,728,778

PREPARATION OF 5-BENZYLOXYINDOLE-ACETONITRILES

Merrill E. Speeter, Kalamazoo, Mich., assignor to The Upjohn Company, Kalamazoo, Mich., a corporation of Michigan No Drawing. Application November 23, 1951,
Serial No. 257,961

6 Claims. (Cl. 260—319)

The present invention relates to novel organic compounds, and is more particularly concerned with a novel method for the production of 5-benzyloxy-3-indoleacetonitriles and with the products thus produced.

The compounds of the present invention may be represented by the formula:

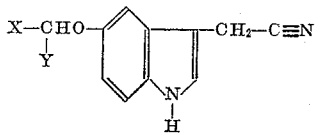

wherein X represents phenyl and wherein Y represents alkyl, cycloalkyl, phenyl, or hydrogen. Within the scope of the term "phenyl" are included substituted phenyl radicals, e. g., alkylphenyl, cycloalkylphenyl, alkoxyphenyl, halophenyl, and aralkylphenyl.

An object of the present invention is to provide new and useful compounds, the 5-benzyloxy-3-indoleacetonitriles. An additional object is the provision of a novel process for the preparation of the new compounds. Other objects of the invention will be apparent to those skilled in the art to which the invention pertains.

The novel compounds of the present invention are important intermediates in the preparation of serotonin [J. Biol. Chem. 180, 961 (1949)], a powerful vasoconstrictor. For example, the novel 5-benzyloxyindoleacetonitriles may be reduced to 5-benzyloxytryptamines, as more fully disclosed in U. S. Patent 2,703,325, and the resulting 5-benzyloxytryptamines converted to the desired serotonin, as more fully disclosed in my co-pending application Serial Number 289,872, filed May 24, 1952. These compounds are also useful in the preparation of resins and polymers, according to the usual procedures for the preparation of such resins or polymers from nitriles and other reactive resin ingredients, and in addition are possessive of certain pharmacological activity per se.

According to the method of the present invention, the 5-benzyloxy-3-indoleacetonitriles are prepared by the treatment of a 5-benzyloxyindole with a Grignard reagent whereby the 5-benzyloxyindole is itself converted into a Grignard reagent. The resulting Grignard reagent is then treated with a haloacetonitrile and thus converted to a 5-benzyloxy-3-indoleacetonitrile.

The compounds which are used as starting materials for the method of the present invention are the 5-benzyloxyindoles. These compounds are prepared by condensing 2-nitro-5-benzyloxytoluenes with ethyl oxalate in the presence of potassium ethoxide to produce 2-nitro-5-benzyloxy-phenylpyruvic acids and reducing the latter with ferrous hydroxide to produce 5-benzyloxyindole-2-carboxylic acids, which are then decarboxylated to 5-benzyloxyindoles by heating in glycerol, according to the method of Burton and Stoves [J. Chem. Soc. (London) 1937, 1726].

In this manner numerous 5-benzyloxyindoles, including 5-alkylbenzyloxyindoles, 5-cycloalkylbenzyloxyindoles, 5-halobenzyloxyindoles, 5-alkoxybenzyloxyindoles, 5-aralkylbenzyloxyindoles, 5-benzhydryloxyindole, 5-(alpha-alkylbenzyloxy)-indoles, 5-(alpha-cycloalkylbenzyloxy)-indoles, 5-(parahalobenzhydryloxy)-indoles, 5-(para,para'-dihalobenzhydryloxy)-indoles, 5-(alpha-alkylalkylbenzyloxy)-indoles, 5-alpha-cycloalkylhalobenzyloxy)-indoles, and the like, are prepared using 2-nitro-5-alkylbenzyloxytoluenes, e. g., 2-nitro-5-methylbenzyloxytoluenes, 2-nitro-5-cycloalkylbenzyloxytoluenes, e. g., 2-nitro-5-cyclohexylbenzyloxytoluenes, 2-nitro-5-halobenzyloxytoluenes, e. g., 2-nitro-5-chlorobenzyloxytoluenes, 2-nitro-5-alkoxybenzyloxytoluenes, e. g., 2-nitro-5-methoxybenzyloxytoluenes, 2-nitro-5-aralkylbenzyloxytoluenes, e. g., 2-nitro-5-benzylbenzyloxytoluenes, 2-nitro-5-benzhydryloxytoluene, 2-nitro-5-(alpha-alkylbenzyloxy)-toluenes, e. g., 2-nitro-5-(alpha-methylbenzyloxy)-toluene, 2-nitro-5-(alpha-cycloalkylbenzyloxy)-toluenes, e. g., 2-nitro-5-(alpha-cyclohexylbenzyloxy)-toluene, 2-nitro-5-(halobenzhydryloxy)-toluenes, e. g., 2-nitro-5-(para-chlorobenzhydryloxy)-toluene, 2-nitro-5-(dihalobenzhydryloxy)-toluenes, e. g., 2-nitro-5-(para,para'-dichlorobenzhydryloxy)-toluene, 2-nitro-5-(alpha-alkylalkylbenzyloxy)-toluenes, e. g., 2-nitro-5-(alpha-propylpara-methylbenzyloxy)-toluenes, and 2-nitro-5-(alpha-cycloalkylhalobenzyloxy)-toluenes, e. g., 2-nitro-5-(alpha-cyclopentyl-para-bromobenzyloxy)-toluene, respectively, in place of the 2-nitro-5-benzyloxytoluene which is used to prepare 5-benzyloxyindole. Other methods of preparing the starting materials of the present invention are known in the art and may be used if desired. An alternative method is given in my co-pending application, Serial Number 273,149, filed February 23, 1952.

The preparation of the 5-benzyloxy-3-indoleacetonitriles is accomplished by reacting a 5-benzyloxyindole with a Grignard reagent and thereafter reacting the resulting 5-benzyloxyindolemagnesium halide with a haloacetonitrile to produce the desired 5-benzyloxy-3-indoleacetonitrile. For the Grignard step a great many Grignard reagents are satisfactory, among them being those prepared from alkyl halides, cycloalkyl halides, aryl halides, and aralkyl halides, the lower-alkyl halides, such as methyl iodide and ethyl bromide, being preferred. The Grignard reaction is carried out in the presence of an organic solvent, diethyl ether and tetrahydrofuran being preferred, although other organic solvents, suitable for use in Grignard reactions, such as benzene, toluene, or anisole, can also be employed. The preparation of the 5-benzyloxyindole Grignard reagent is usually conducted at the boiling point of the solvent employed, although other temperatures between about zero and 150 degrees centigrade, preferably between about zero and 100 degrees centigrade, may also be used, a longer reaction period being required in the lower temperature ranges. The resulting 5-benzyloxindolemagnesium halide is then reacted with a haloacetonitrile, such as chloroacetonitrile, bromoacetonitrile, or iodoacetonitrile, with chloroacetonitrile being preferred. The same organic solvent as employed for the previous step is usually utilized, although others may be used if desired. The temperature range for the reaction of the haloacetonitrile and the 5-benzyloxyindolemagnesium halide is usually between about zero and 100 degrees centigrade, with the reaction ordinarily being conducted at the boiling point of the solvent employed. After refluxing for a period of about one to five hours, the resulting 5-benzyloxy-3-indoleacetonitrile is separated by conventional procedure, which, for example, may involve a mild hydrolysis, as with dilute acetic acid, to form an ether layer containing the 5-benzyloxy-3-indoleacetonitrile and a water layer, from which the ether-5-benzyloxy-3-indoleacetonitrile layer may be separated and dried to give an ethereal solution of the 5-benzyloxy-3-indoleacetonitrile. From this solution, the desired 5-benzyloxy-3-indoleacetonitrile may be obtained in high purity by evaporation or solvent removal according to other conventional procedure.

The following examples will serve to illustrate the process and products of this invention, but the said invention is not to be considered as limited thereto.

*Example 1.—5-benzyloxy-3-indoleacetonitrile*

To a Grignard reagent prepared from 4.25 grams (0.03 mole) of methyl iodide and 2.0 grams of magnesium in 200 milliliters of ether was added a solution of 5.5 grams (0.025 mole) of 5-benzyloxyindole in 200 milliters of ether. After heating under reflux for thirty minutes, the mixture was cooled in an ice-bath and a solution of three grams (0.04 mole) of freshly-distilled chloroacetonitrile in 100 milliliters of ether was added thereto. The mixture was heated vigorously under reflux for two and one-half hours, cooled and hydrolyzed by the addition of a solution of ten milliliters of glacial acetic acid and ninety milliliters of water. The ether layer was separated and the aqueous layer extracted with several portions of ether. The combined ether solutions were washed successively with water, sodium carbonate solution and water, and dried over potassium carbonate for at least 24 hours to give an ethereal solution of 5-benzyloxy-3-indoleacetonitrile from which the desired 5-benyloxy-3-indoleacetonitrile is obtained by evaporation or other conventional procedure.

*Example 2.—5-(para-methylbenzyloxy)-3-indoleacetonitrile*

In essentially the same manner as disclosed in Example 1, 5-(para-methylbenzyloxy)-3-indoeacetonitrile is prepared by reacting a methyl iodide Grignard reagent with 5-(para-methylbenzyloxy)-indole, and thereafter reacting the 5-(para-methylbenzyloxy)-indolemagnesium iodide with chloroacetonitrile.

In the same manner the following are prepared from the appropriate 5-alkylbenzyloxyindole: 5-(meta-ethylbenzyloxy) - 3 - indoleacetonitrile, 5-(para - propylbenzyloxy)-3-indoleacetonitrile, 5-(meta-isopropylbenzyloxy)-3-indoleacetonitrile, 5-(meta-butylbenzyloxy)-3-indoleacetonitrile, 5-(para-amylbenzyloxy)-3-indoleacetonitrile, 5-(para-hexylbenzyloxy)-3-indoleacetonitrile, 5-(para-heptylbenzyloxy)-3-indoleacetonitrile, 5-(para-octylbenzyloxy)-3-indoleacetonitrile, and the like.

*Example 3.—5-(para-benzylbenzyloxy)-3-indoleacetonitrile*

In essentially the same manner as disclosed in Example 1, 5-(para-benzylbenzyloxy)-3-indoleacetonitrile is prepared by reacting methyl iodide Grignard reagent with 5-(para-benzylbenzyloxy)-indole, and thereafter reacting the 5-(para-benzylbenzyloxy)-indolemagnesium iodide with chloroacetonitrile.

In the same manner other 5-aralkylbenzyloxyindoleacetonitriles are prepared from the appropriate 5-aralkylbenzyloxyindole, e. g., 5-(para-phenethylbenzyloxy)-3-indoleacetonitrile, 5-(meta-phenylpropylbenzyloxy)-3-indoleacetonitrile, 5-(para-phenylhexylbenzyloxy)-3-indoleacetonitrile, and the like.

*Example 4.—5-(para-methoxybenzyloxy)-3-indoleacetonitrile*

In essentially the same manner as disclosed in Example 1, 5-para-methoxybenzyloxy)-3-indoleacetonitrile is prepared by reacting methyl iodide Grignard reagent with 5-(para-methoxybenzyloxy)-indole, and thereafter reacting the 5-(para-methoxybenzyloxy)-indolemagnesium iodide with chloroacetonitrile.

In the same manner other 5-alkoxybenzyloxyindoleacetonitriles are prepared from the appropriate 5-alkoxybenzyloxyindole, such as 5-(ortho-ethoxybenzyloxy)-3-indoleacetonitrile, 5 - (para-propoxybenzyloxy) - 3 - indoleacetonitrile, 5-(meta-isopropoxybenzyloxy)-3-indoleacetonitrile, 5-(para-butoxybenzyloxy)-3-indoleacetonitrile, 5-(para-amyloxybenzyloxy)-3-indoleacetonitrile, 5-(meta-hexoxybenzyloxy)-3-indoleacetonitrile, 5-(para-heptoxybenzyloxy) - 3 - indoleacetonitrile, 5 - (para-octoxybenzyloxy)-3-indoleacetonitrile, and the like.

*Example 5.—5-benzhydryloxy-3-indoleacetonitrile*

In essentially the same manner as disclosed in Example 1, 5-benzhydryloxy-3-indoleacetonitrile is prepared by reacting methyl iodide Grignard reagent with 5-benzhydryloxyindole, and thereafter reacting the 5-benzhydryloxyindole-magnesium iodide with chloroacetonitrile.

In essentially the same manner as disclosed in Example 5, the following 5-halobenzhydryloxy-3-indoleacetonitriles are prepared from the appropriate 5-halobenzhydryloxyindoles: 5 - (para-iodobenzhydryloxy - 3 - indoleacetonitrile, 5-(meta-bromobenzhydryloxy)-3-indoleacetonitrile, 5 - (para,para' - dichlorobenzhydryloxy) - 3 - indoleacetonitrile, and the like.

*Example 6.—5-(para-cyclohexylbenzyloxy)-3-indoleacetonitrile*

In essentially the same manner as disclosed in Example 1, 5-(para-cyclohexylbenzyloxy)-3-indoleacetonitrile is prepared by reacting ethyl bromide Grignard reagent with 5-(para-cyclohexylbenzyloxy)-indole, and thereafter reacting the 5-(para-cyclohexylbenzyloxy)-indolemagnesium bromide with bromoacetonitrile.

In the same manner the following are prepared from the appropriate 5-cycloalkylbenzyloxyindole: 5-(meta-cyclopentylbenzyloxy)-3-indoleacetonitrile, 5-(ortho-cyclopentylbenzyloxy)-3-indoleacetonitrile, 5-(para-cyclopentyl benzyloxy)-3-indoleacetonitrile, 5-(ortho-cyclopentylbenzyloxy) - 3 - indoleacetonitrile, 5 - (ortho - cyclohexylbenzyloxy)-3-indoleacetonitrile, 5-(meta-cyclohexylbenzyloxy)-3-indoleacetonitrile, and the like.

*Example 7.—5-(para-chlorobenzyloxy)-3-indoleacetonitrile*

In essentially the same manner as disclosed in Example 1, 5-(para-chlorobenzyloxy)-3-indoleacetonitrile is prepared by reacting methyl iodide Grignard reagent with 5-(para-chlorobenzyloxy)-indole, and thereafter reacting the 5-(para-chlorobenzyloxy)-indolemagnesium iodide with iodoacetonitrile.

In the same manner the following are prepared from the appropriate 5-halobenzyloxyindole: 5-(meta-bromobenzyloxy)-3-indoleacetonitrile, 5-(para-iodobenzyloxy)-3-indoleacetonitrile, 5-(para-fluorobenzyloxy)-3-indoleacetonitrile, and the like.

*Example 8.—5-(alpha-methyl-benzyloxy)-3-indoleacetonitrile*

In essentially the same manner as disclosed in Example 1, 5-(alpha-methyl-benzyloxy)-3-indoleacetonitrile is prepared by reacting methyl iodide Grignard reagent with 5-(alpha-methyl-benzyloxy)-indole, and thereafter reacting the 5-(alpha-methyl-benzyloxy)-indolemagnesium iodide with chloroacetonitrile.

In the same manner the following are prepared from the appropriate 5-(alpha-alkyl-benzyloxy)-indole: 5-(alpha - ethyl - benzyloxy) - 3 - indoleacetonitrile, 5 - (alpha - propyl - benzyloxy) - 3 - indoleacetonitrile, 5 - (alpha - isopropyl - benzyloxy) - 3 - indoleacetonitrile, 5 - (alpha - octyl - benzyloxy) - 3 - indoleacetonitrile, and the like.

*Example 9.—5-(alpha-cyclohexyl-benzyloxy)-3-indoleacetonitrile*

In essentially the same manner as disclosed in Example 1, 5-(alpha-cyclohexyl-benzyloxy)-3-indoleacetonitrile is prepared by reacting methyl iodide Grignard reagent with 5 - (alpha-cyclohexyl-benzyloxy)-indole, and thereafter reacting the 5-(alpha-cyclohexyl-benzyloxy)-indolemagnesium iodide with chloroacetonitrile.

In the same manner the following are prepared from the appropriate 5-(alpha-cycloalkyl-benzyloxy)-indole: 5 - (alpha - cyclobutyl - benzyloxy) - 3 - indoleacetonitrile, 5 - (alpha - cyclopentyl - benzyloxy) - 3 - indoleacetonitrile, and the like.

Other representative 5-benzyloxy-3-indoleacetonitriles which may be prepared in this manner are: 5 - (alpha - alkyl - alkylbenzyloxy) - 3 - indoleacetonitriles, e. g., 5 - (alpha - methyl - para - methylbenzyloxy) - 3 - indoleacetonitrile, 5 - (dicycloalkylbenzhydryloxy) - 3 - indoleacetonitriles, e. g., 5 - (para,para' - dicyclopentyl - benzhydryloxy) - 3 - indoleacetonitrile, 5 - (dialkyl - benzhydryloxy) - 3 - indoleacetonitriles, e. g., 5 - (para - para' - dimethylbenzhydryloxy) - 3 - indoleacetonitrile, 5 - (dialkoxybenzhydryloxy) - 3 - indoleacetonitriles, e. g., 5 - (para,para' - dimethoxybenzhydryloxy) - 3 - indoleacetonitrile, 5 - (diaralkylbenzhydryloxy) - 3 - indoleacetonitriles, e. g., 5 - (para,para' - dibenzyl - benzhydryloxy)-3-indoleacetonitrile, and the like.

It is to be understood that the invention is not to be limited to the exact details of operation or exact compounds shown and described, as obvious modifications and equivalents will be apparent to one skilled in the art, and the invention is therefore to be limited only by the scope of the appended claims.

I claim:

1. A 5-benzyloxy - 3 - indoleacetonitrile represented by the formula:

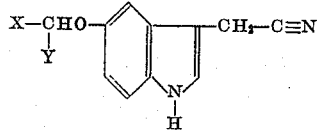

wherein X is selected from the group consisting of phenyl, alkylphenyl, cycloalkylphenyl, alkoxyphenyl, halophenyl, and aralkylphenyl, and Y is selected from the group consisting of phenyl, alkylphenyl, cycloalkylphenyl, alkoxyphenyl, halophenyl, aralkylphenyl, alkyl, cycloalkyl, and hydrogen.

2. 5-(para-methylbenzyloxy)-3-indoleacetonitrile.
3. 5-(para-benzylbenzyloxy)-3-indoleacetonitrile.
4. 5-(para-methoxybenzyloxy)-3-indoleacetonitrile.
5. 5-benzhydryloxy-3-indoleacetonitrile.
6. 5-benzyloxy-3-indoleacetonitrile.

References Cited in the file of this patent

Wieland et al.: Annalen der Chemie, Band 513, pp. 1–25 (1934).

Burton et al.: J. Chem. Soc., 1937, pp. 1726–28.